United States Patent Office 2,898,328
Patented Aug. 4, 1959

2,898,328

POLYMERISATION OF OLEFINS

Hugh Wilma Boulton Reed and William Edward Alexander Mitchell, Norton-on-Tees, England, assignors to Imperial Chemical Industries Limited, London, England, a corporation of Great Britain No Drawing. Application July 8, 1957
Serial No. 670,395

Claims priority, application Great Britain
July 10, 1956

8 Claims. (Cl. 260—93.7)

This invention relates to the polymerisation of olefins.

The invention is applicable to the polymerisation of olefins to form solid polymers which are suitable for working up into, for example, filaments, foils, sheets and tubes having very desirable properties and also to form lower molecular weight polymers which are suitable as chemical intermediates. The solid polymers may contain substantial amounts of material insoluble in ether and giving the regular X-ray diffraction pattern characteristic of a crystalline material.

According to the invention there is provided a process for the polymerisation of an olefin in which the olefin is brought into contact with a reaction medium comprising a material formed by reacting a partially oxidised organo-compound of one or more non-transition metals of groups 1, 2 or 3 of the periodic system with a halide of a transition metal of groups 4 to 8 of the periodic system, the degree of oxidation of the organo-compound being less than that represented by the conversion per mole of the organo-compound of one of the hydrocarbon radicals —R to a radical —OR.

The process may be used in the polymerisation of a wide variety of olefins such as ethylene, alpha-olefins such as propylene, butene-1 and styrene and di-olefins such as butadiene. The process of the invention is particularly applicable to the polymerisation of propylene.

A non-transition metal is defined as a metal of one of the short periods of the periodic system or a metal of one of the long periods occupying one of the two places immediately following an inert gas or one of the seven places which immediately precede an inert gas. Examples of suitable non-transition metals are aluminium, beryllium, zinc, magnesium, lithium and sodium.

The organo-compound which is submitted to partial oxidation should contain at least one hydrocarbon radical attached to an atom of a non-transition metal, any remaining metal valencies being satisfied by hydrogen or halogen atoms.

Suitable hydrocarbon radicals include alkyl, alkenyl, alkynyl, cyclo-alkyl, aryl and aralkyl radicals, of which alkyl is preferred.

Particularly suitable organo-compounds are aluminium alkyls e.g. aluminium trimethyl, aluminium triethyl and aluminium tripropyl. Other suitable organo-compounds are the complex alkyls of an alkali metal and of aluminium e.g. lithium aluminium tetraethyl.

Mixtures of organo-compounds may be used in the process of the invention.

The use of a partially oxidised organo-compound in the process according to the invention enables higher yields of polyolefines to be obtained than are obtained using an organo-compound which has not been partially oxidised.

The degree of oxidation of the organo-compound which gives the best yield of polyolefin is dependent upon, inter alia, the composition of the organo-compound. In general, therefore, the desired degree of oxidation may vary within wide limits provided that the degree of oxidation is less than that represented by the conversion per mole of organo-compound of one of the hydrocarbon radicals —R to a radical —OR.

If the organo-compound is an aluminium trialkyl a preferred range of degree of oxidation is between 5% and 60% molar, particularly between 15% and 35% molar, of the oxidation represented by conversion of one alkyl group to an alkoxy group.

The oxidation of the organo-compound may be carried out by bringing it into contact with a variety of oxidising agents suitably air or an alcohol e.g. ethanol.

Examples of suitable transition metal halides are titanium tetrachloride, titanium trichloride, vanadium tetrachloride, molybdenum pentachloride and tungsten hexachloride of which the titanium halides are preferred.

The partially oxidised organo-compound and the transition metal compound should be reacted together in a molecular ratio within the range 20:1 to 1:20. It is preferred to use molecular ratios within the range 12:1 to 1:4.

A reaction medium containing the reaction products of small amounts of a partially oxidised organo-compound and a transition metal compound will effect the polymerisation of relatively large amounts of the olefin. However in order to maintain a high conversion of the olefin into polymer it is desirable to add further quantities of partially oxidised organo-compound and transition metal compound to the reaction medium as required.

The catalytic activity of the reaction medium may be promoted by the presence of a metal halide, particularly those halides which are catalysts for Friedel-Crafts reactions or an organo-metal halide. Very suitable promoters are alkyl aluminium sesquihalides, for example, ethyl aluminium sesquihalide. Another suitable promoter is aluminium chloride. Suitable amounts of the promoter are up to 20% by weight of the partially oxidised organo-compound.

The reaction medium preferably also comprises a solvent. The solvent may be the olefin undergoing polymerisation provided that it is in the liquid state under the conditions of the polymerisation process. Except when the solvent is such an olefin, the solvent should be inert under the reaction conditions. Suitable inert solvents are paraffinic, aromatic and alicyclic hydrocarbons.

The olefin may be brought into contact with the reaction medium in a variety of ways. If the olefin is a gas, it may for example, be passed across the surface of the medium or bubbled through the medium. If the olefin is in the liquid state under the conditions of operating the process it may be mixed with the medium.

Mixtures of olefins may be polymerised. The olefins may be pure or in admixture with substances e.g. other hydrocarbons, which are inert under the conditions of the polymerisation reaction.

The pressure at which the poymerisation is carried out may be atmospheric, below atmospheric or above atmospheric pressure, up to for example, 100 atmospheres. Temperatures within a wide range may be used.

The particular combination of temperature and pressure selected depends largely on whether it is desired to operate the process with the olefin in the gaseous or liquid state. If the olefin is to be polymerised in the liquid state the temperature selected must be below the critical temperature and sufficient pressure applied to maintain the olefin in the liquid state.

It is preferred to use temperatures below 100° C. Very suitable temperatures are within the range of about 20° to about 80° C., especially within the range 40° to 60° C. Temperatures down to about —80° C., however, may be employed. Also temperatures as high as 300° C. may be used if the polymerization process is carried out with the olefin in the vapour state.

Water and oxygen should not be present in the apparatus in which the polymerisation is effected in more than relatively small amounts since they decompose organo-compounds. Air is suitably displaced from the apparatus by an inert atmosphere of, for example, nitrogen.

EXAMPLE

A series of polymerisations of propylene were carried out under standard conditions to demonstrate the increase in the yield of solid polymer obtained by oxidising aluminium tripropyl to varying degrees before reacting it with titanium tetrachloride to form the reaction medium.

The apparatus used consisted of a flask fitted with a gas inlet tube, a dropping funnel, a condenser and a stirrer. Water was excluded from the apparatus and the air displaced by an atmosphere of nitrogen.

The reaction medium was prepared by oxidising to the required degree 0.075 gm. moles aluminium tripropyl dissolved in 25 ml. petroleum ether (boiling range 60° to 80° C.) and then introducing this solution into the flask containing a vigorously stirred solution of 0.036 mole titanium tetrachloride in 2 litres petroleum ether (boiling range 60° to 80° C.).

Propylene was passed into the flask at 60 litres/hour so that it contacted the surface of the reaction medium and until no further absorption of propylene occurred. The temperature of the reaction medium was initially room temperature; it rose to a maximum of about 60° during the absorption of propylene.

After discontinuing the flow of propylene, the reaction mixture was cooled and methanol added to deactivate the reaction medium and precipitate the polymer. The solid polymer was then filtered off.

The following tables show the yields of polymer obtained when using partially oxidised aluminium tripropyl, taking the yield with the unoxidised material to be 100. The actual yields were calculated as moles propylene converted into polymer per mole aluminium tripropyl used. In the experiments reported in Table 1 the aluminium tripropyl was oxidised by absolute ethanol under an inert atmosphere while in the experiments reported in Table 2 the oxidising agent was dry air diluted with nitrogen. During the oxidation process the temperature varied between room temperature and about 50° C.

The column headed "Percent molar AlPr₃ oxidised" gives the molar percentage of aluminium tripropyl oxidised with reference to the oxidation represented by conversion of one propyl group to a propoxy group.

Table 1

| Percent molar AlPr₃ oxidised: | Yield of polymer |
|---|---|
| 15 | 101 |
| 25 | 143 |
| 30 | 144 |
| 60 | 67 |

Table 2

| Percent molar AlPr₃ oxidised: | Yield of polymer |
|---|---|
| 15 | 129 |
| 30 | 133 |

We claim:
1. A process for the polymerization of an olefin selected from the group consisting of ethylene, propylene, butene-1, styrene and butadiene, which comprises contacting said olefin at a temperature between −80° C. and 300° C. with a reaction medium comprising the reaction product of a partially oxidized aluminum alkyl and a halide of a metal selected from the group consisting of titanium, vanadium, molybdenum and tungsten, the molecular ratio of aluminum alkyl and halide being in the range of 20:1 to 1:20 and the degree of oxidation of the aluminum alkyl being between 15 and 35 molar percent of that represented by conversion of one of the alkyl groups therein to an alkoxy group, said polymerization being carried out in the presence of a liquid hydrocarbon solvent selected from the group consisting of inert hydrocarbon solvents and unpolymerized olefin.

2. The process of claim 1 wherein said reaction medium includes an organo-metal halide.

3. A process as claimed in claim 1 in which the halide is a titanium halide.

4. A process as claimed in claim 3 in which the halide is titantium tetrachloride.

5. A process as claimed in claim 1 in which the alkyl is an aluminium tri-alkyl.

6. A process as claimed in claim 1 wherein said alkyl and halide are utilized in a molecular ratio within the range of 12:1 to 1:4.

7. A process as claimed in claim 1 wherein said aluminum alkyl is al alkali metal aluminum alkyl.

8. A process for the polymerisation of propylene in which propylene is brought into contact at a temperature within the range of 20° to 80° C. with a reaction medium comprising an inert hydrocarbon solvent and a material formed by reacting a partially oxidised aluminium tri-alkyl with a titanium halide in a molecular ratio aluminium tri-alkyl:titanium halide within the range 12:1 to 1:4, the degree of oxidation of the aluminium tri-alkyl being between 15 and 35 molar percent of that represented by conversion of one of the alkyl groups to an alkoxy group.

References Cited in the file of this patent

UNITED STATES PATENTS

| 2,440,498 | Young et al. | Apr. 27, 1948 |
| 2,700,663 | Peters | Jan. 25, 1955 |
| 2,710,854 | Seelig | June 14, 1955 |

FOREIGN PATENTS

| 534,792 | Belgium | Jan. 31, 1955 |
| 533,362 | Belgium | May 16, 1955 |